United States Patent
Yang

(10) Patent No.: US 10,695,948 B2
(45) Date of Patent: Jun. 30, 2020

(54) MOLDING MACHINE FOR SYNTHESIZING STONE BY MEANS OF BEATS OF HEAVY HAMMER, AND PROCESSING TECHNOLOGY

(71) Applicant: ANHUI UISTONE GREEN MATERIAL HI-TEC CO., LTD., Wuhu, Anhui (CN)

(72) Inventor: Shaoliang Yang, Shanghai (CN)

(73) Assignee: Anhui Uistone Green Material Hi-Tec Co., Ltd., Wuhu (CN)

( * ) Notice: Subject to any disclaimer, the term of this patent is extended or adjusted under 35 U.S.C. 154(b) by 247 days.

(21) Appl. No.: 15/544,499

(22) PCT Filed: Aug. 18, 2015

(86) PCT No.: PCT/CN2015/087371
§ 371 (c)(1),
(2) Date: Jul. 18, 2017

(87) PCT Pub. No.: WO2016/115884
PCT Pub. Date: Jul. 28, 2016

(65) Prior Publication Data
US 2017/0368712 A1    Dec. 28, 2017

(30) Foreign Application Priority Data
Jan. 20, 2015    (CN) .......................... 2015 1 0026692

(51) Int. Cl.
*B28B 1/04*    (2006.01)
(52) U.S. Cl.
CPC ..................... *B28B 1/04* (2013.01)

(58) Field of Classification Search
None
See application file for complete search history.

(56) References Cited

U.S. PATENT DOCUMENTS

| | | | | |
|---|---|---|---|---|
| 3,225,410 A | * | 12/1965 | Boyer | B28B 1/04 425/352 |
| 3,925,000 A | * | 12/1975 | Haberle | B28B 1/04 425/422 |
| 3,988,279 A | * | 10/1976 | Klassen | C04B 28/04 523/401 |
| 4,373,889 A | * | 2/1983 | Brown | B28B 3/02 425/150 |

(Continued)

FOREIGN PATENT DOCUMENTS

| CN | 1458107 A | 11/2003 |
|---|---|---|
| CN | 101468487 A | 7/2009 |
| CN | 202241535 U | 5/2012 |

(Continued)

*Primary Examiner* — Monica A Huson
(74) *Attorney, Agent, or Firm* — Young Basile Hanlon & MacFarlane, P.C.

(57) ABSTRACT

A molding machine for synthesizing a stone by means of beats of a heavy hammer includes a base, a heavy hammer mounted on the base, and a driving device for driving the heavy hammer. The base is provided with a material-load zone, and the heavy hammer is configured to beat the material-load zone. A processing method for synthesizing a stone by means of beats of a heavy hammer includes the following steps: burdening; material distribution; shaping; and solidification.

15 Claims, 7 Drawing Sheets

(56) References Cited

U.S. PATENT DOCUMENTS 4,601,352 A * 7/1986 Hamilton ................. B30B 1/00
  173/122
5,580,409 A * 12/1996 Andersen .............. B01F 3/1214
  156/210

FOREIGN PATENT DOCUMENTS

| CN | 202910966 U | 5/2013 |
| CN | 204604514 U | 9/2015 |
| CN | 204604515 U | 9/2015 |
| WO | 2010/008596 A1 | 1/2010 |

* cited by examiner

MOLDING MACHINE FOR SYNTHESIZING STONE BY MEANS OF BEATS OF HEAVY HAMMER, AND PROCESSING TECHNOLOGY

CROSS-REFERENCE TO RELATED APPLICATION(S)

This application claims priority to Chinese Patent Application No. 201510026692.1, filed on Jan. 20, 2015, the contents of which are hereby incorporated by reference in its entirety.

TECHNICAL FIELD

The present disclosure relates to a molding apparatus for synthesizing stone and a processing method for the same, and more particularly to a molding machine for synthesizing a stone by means of beating of a heavy hammer without pressure system and a processing method for the same.

BACKGROUND

As an important part of the construction materials, natural stone is always widely used since ancient times because of its various colors and easy developing process. However, because of the excessive increase of mining and the low mining utilization rate, the mining of the natural stone is gradually limited. Especially in European countries, the mining of the natural stone has already been prohibited. Moreover, the variety of colors and designs of products in each mining area is unique, which increases the difficulty in use. Thus, people always look for a substitute of the natural stone. With the development of economy, construction decoration materials change rapidly, and the synthetic stone as a new decoration material meets a good development opportunity. However, the use of the pressure system in cooperation with the vibration system of the production equipment of the synthetic stone is a technical problem, which renders the equipment manufacture complex, the production operation is unstable and the repair and maintain rates are high, and the production efficiency cannot meet the scalable standard.

For instance, a patent for utility model No. CN201120319813.9 discloses an artificial quartz compressing machine, comprising a base, a support mounted on both sides of the base, a damping spring mounted on a bottom of the base, and a peripheral frame and a punch mounted on the base, in which a guide post is provided on the base. A shaft sleeve is provided on the peripheral frame and the punch, the peripheral frame and the punch are movably connected to the guide post via the shaft sleeve, a roof is fixedly connected to an upper end of the guide post. A hydraulic cylinder for the punch and a hydraulic cylinder for the peripheral frame are provided on the roof, the hydraulic cylinder for the punch is connected to the punch via a hydraulic cylinder attachment base, the hydraulic cylinder for the peripheral frame is connected to the peripheral frame via a hydraulic cylinder attachment base, a bottom of the peripheral frame and a connection portion of the punch are provided with a vacuum seal, a vibration motor is provided on the punch. A conveying belt is provided above the support and the base, and conveying wheels are provided at both ends of the conveying belt.

In the above technical solution, a pressure is applied via hydraulic pressure and then a vibration is applied via the vibration motor. However, such pressing manner has following disadvantages. Since the vibration motor works under high frequency vibration, such that the hydraulic system is permanently in the cycle of pressurization and release, and is always in a virtual pressure state, and thus it cannot apply a sufficient pressure to a quartz board. Meanwhile, the vibration system causes a sustained and continuous damage to the stability of the machine. A lot of time is wasted in order to mold the board. The above technical solution may be called as a "press & vibration" synthetic manner, and the problem to be solved in this field is how to combine the pressure force and the vibration force. However, this problem has never been solved, thus severely affecting the development of the molding apparatus for synthesizing stone. It always lacks of a mature and large-scale applied molding apparatus and process for synthesizing stone with quick molding speed.

SUMMARY

Technical problems to be solved by the present disclosure lie to overcome the disadvantages of the related art. A molding machine for synthesizing a stone by means of beating of a heavy hammer with relatively higher synthetic force, quick molding speed, good densification and simple structure is provided. Meanwhile, a process method for beating a loose synthetic stone mixture into a board structure with a heavy hammer and in vacuum is provided.

According to embodiments of the present disclosure, a molding machine for synthesizing a stone by means of beating of a heavy hammer is provided, comprising: a base; a heavy hammer mounted on the base; and a driving device for driving the heavy hammer, wherein the base is provided with a material-load zone, and the heavy hammer is configured to beat the material-load zone.

The molding machine for synthesizing a stone by means of beating of a heavy hammer according to embodiments of the present disclosure further has following appended technical features.

The heavy hammer comprises: a hammer plate in contact with a synthetic stone mixture in the material-load zone; and a loading plate located on the hammer plate for increasing weight, and the loading plate and the hammer plate are connected together.

A plurality of supports are provided on the hammer plate, and the hammer plate is connected with the loading plate via the supports.

The loading plate is formed by stacking multilayer loading boards.

A frame is further provided on the hammer plate, a suspension member is mounted on an edge of the frame, and the suspension member is hooked on the hammer plate.

The base is provided with a lifting device, and the lifting device is connected with the heavy hammer.

The driving device is provided on the heavy hammer, and the driving device is composed by a plurality of drivers synchronously connected together.

The plurality of drivers are synchronously connected together to compose a synchronous drive group, and the heavy hammer is provided with at least one synchronous drive group.

The synchronous drive group is distributed at same or different layers.

The driving device is mounted on the hammer plate and/or on the loading plate.

According to embodiments of the present disclosure, a processing method for synthesizing a stone by means of beating of a heavy hammer is provided, comprising steps of:

A. burdening, including mixing a mixed aggregate of the synthetic stone, a filler and an adhesive in a ratio to form a synthetic stone mixture;
B. material distributing, including distributing the synthetic stone mixture evenly onto a conveying belt or into a frame according to a desired thickness;
C. shaping, including vacuumizing the synthetic stone mixture, then beating the synthetic stone mixture continuously by the heavy hammer, wherein the adhesive in the synthetic stone mixture flows during beating, thus being distributed uniformly in the synthetic stone mixture and fully filling gaps among particles of the aggregates, and a redundant adhesive is squeezed out of the synthetic stone mixture to form a dense synthetic stone board;
D. solidifying, including solidifying the molded synthetic stone board to form a finished product.

The processing method for synthesizing a stone by means of beating of a heavy hammer according to embodiments of the present disclosure further has following appended technical features.

A mass m of the heavy hammer is determined by a formula, $$m = A \times (\rho_{aggregate} \times a\% + \rho_{adhesive} \times b\%) \times V \times K$$

where A is a particle amount coefficient of the mixed aggregate of the synthetic stone, A is a constant, and $A \leq 1$;
$\rho_{aggregate}$ is a particle density of the mixed aggregate of the synthetic stone, a unit of $\rho_{aggregate}$ is $kg/m^3$, and a % is a ratio of the mixed aggregate of the synthetic stone;
$\rho_{adhesive}$ is an adhesive density, a unit of $\rho_{adhesive}$ is $kg/m^3$, and b % is a ratio of the adhesive;
V is a volume of the synthetic stone mixture, and a unit of V is $m^3$;
K is a mass coefficient of the heavy hammer, K is a constant and ranges from 100 to 3000.

The particle amount coefficient A of the mixed aggregate of the synthetic stone is determined by a particle size of the aggregate, and is increased as the particle size of the aggregate is reduced, the particle amount coefficient A of the mixed aggregate of the synthetic stone is 0.8 to 1 if the particle size is less than 100 micrometers; the particle amount coefficient A of the mixed aggregate of the synthetic stone is 0.2 to 0.8 if the particle size ranges from 100 micrometers to 1000 micrometers; and the particle amount coefficient A of the mixed aggregate of the synthetic stone is 0.04 to 0.2 if the particle size is greater than 1000 micrometers.

The particle amount coefficient A of the mixed aggregate of the synthetic stone is calculated by $$A = A_1 \times R_1\% + A_2 \times R_2\% + A_3 \times R_3\% \ldots + A_n \times R_n\%$$

where $A_1, A_2, A_3 \ldots A_n$ are coefficients of aggregates with different particle sizes, and $R_1, R_2, R_3, \ldots R_n$ are ratios of aggregates with different particle sizes.

The molding machine and processing method for synthesizing a stone by means of beating of a heavy hammer according to embodiments of the present disclosure have following advantages compared with the prior art. In the present disclosure, a heavy hammer with sufficient mass is used to beat the synthetic stone mixture on the base directly and continuously by the power of the driving device, the adhesive in the synthetic stone mixture flows during beating, thus being distributed uniformly in the synthetic stone mixture to form a synthetic stone board with high strength and high density, which greatly reduces the mass adhesive required in the production method for synthesizing a stone in the prior art. The present disclosure has advantages of simple structure, stable operation, convenient maintenance, quick production speed, etc., which may fully satisfy requirements of a large-scale production. The processing method for synthesizing a stone provided by the embodiments of the present disclosure presses and synthesizes stone board by means of beating of a heavy hammer, which is an innovative process and is different from the press & vibration process in the prior art, thus increasing the molding speed of the board, increasing the yield of the production line, and reducing the production cost.

DETAILED DESCRIPTION

Figure 1:
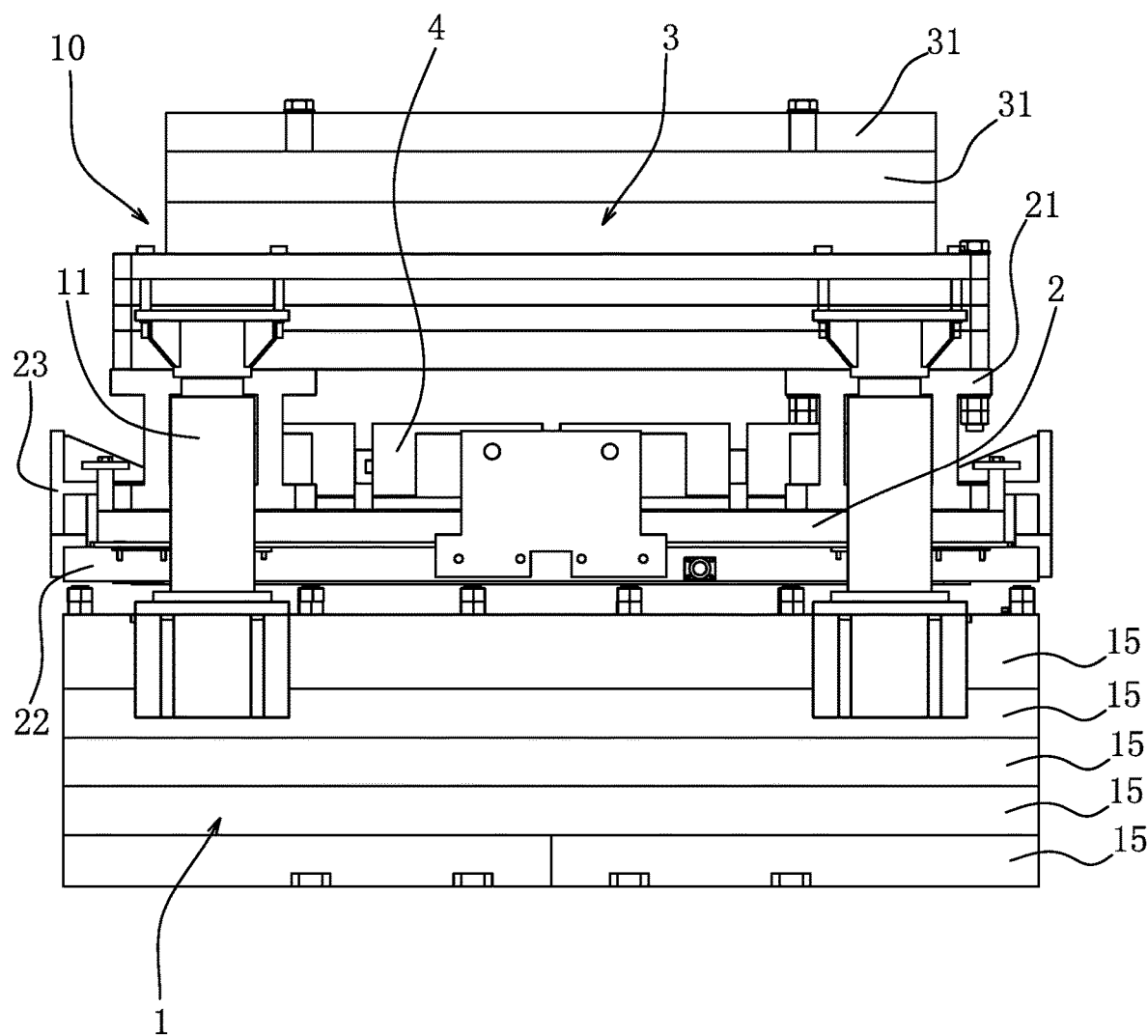
FIG. 1 is a front view of the present disclosure.
Figure 2:
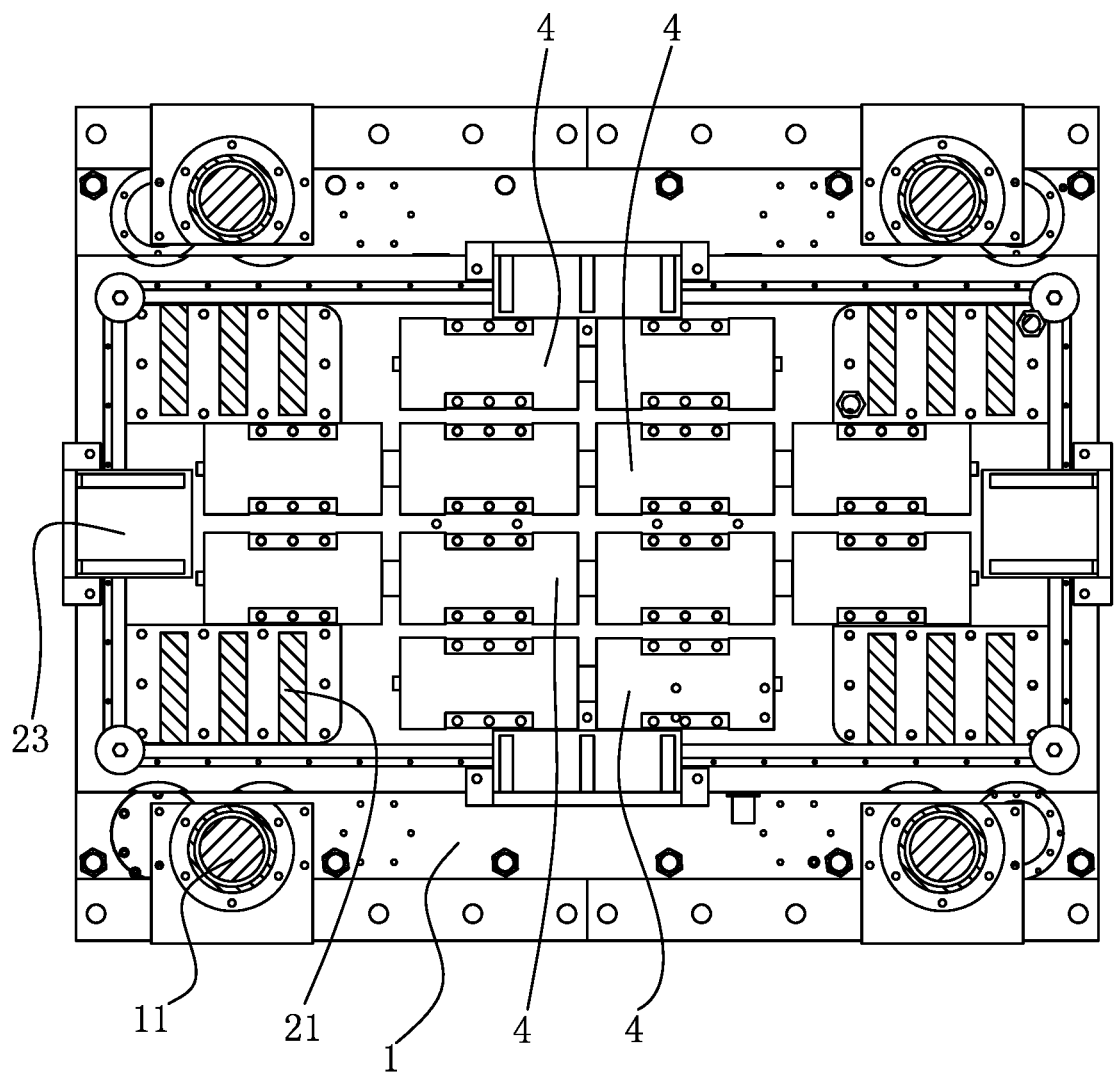
FIG. 2 is a top view of the present disclosure without a loading plate.
Figure 3:
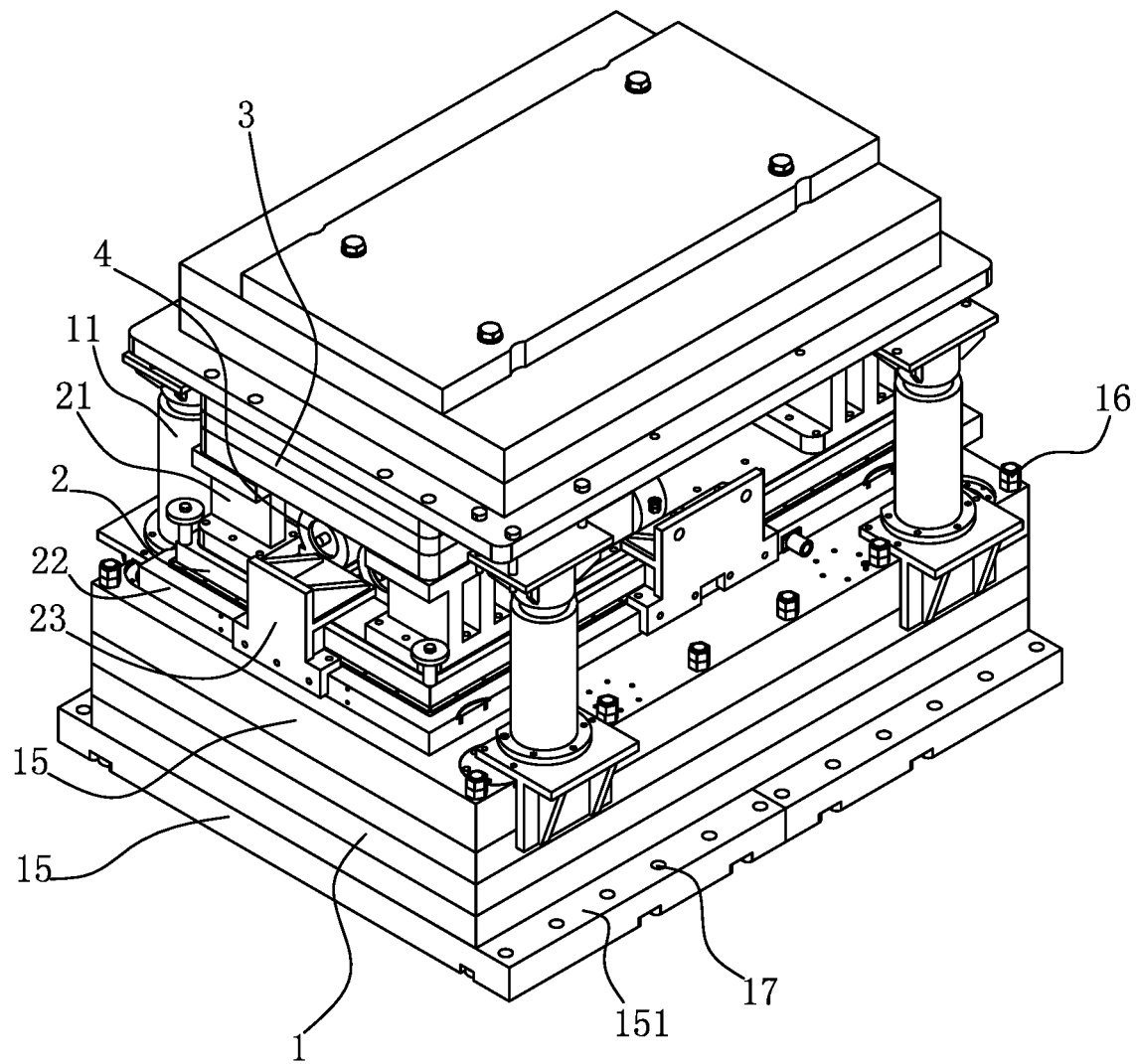
FIG. 3 is a perspective view of the present disclosure.

With reference to FIGS. 1-4, in embodiments of the present disclosure, a molding machine for synthesizing a stone by means of beating of a heavy hammer is provided and comprises a base 1, a heavy hammer 10 mounted on the base 1 and a driving device 4 for driving the heavy hammer 10. The base 1 is provided with a material-load zone, and the heavy hammer 10 is configured to beat the material-load zone. The heavy hammer provided by the present disclosure has sufficient weight and directly beats the synthetic stone mixture in the material-load zone to press the synthetic stone mixture. In terms of a manner for molding the synthetic stone, the "means of beating of a heavy hammer" provided by the present disclosure is totally different from a "press & vibration" manner in the prior art. The present disclosure overcomes a virtual pressure problem existing in the prior art. The adhesive in the synthetic stone mixture flows by means of "beating", thus being distributed uniformly in the synthetic stone mixture and fully filling gaps among particles of the aggregates, and a redundant adhesive can be squeezed out of the synthetic stone mixture, thus press properly the synthetic stone mixture.

With reference to FIGS. 1-4, in the above embodiments of the present disclosure, the heavy hammer 10 comprises a hammer plate 2 in contact with a synthetic stone mixture in the material-load zone and a loading plate 3 located on the hammer plate 2 for increasing weight, and the loading plate 3 and the hammer plate 2 are connected together. The present disclosure is provided with a combined weight structure of the hammer plate 2 and the loading plate 3 to form an independent heavy hammer beating unit without pressure system. This structure may provide a beating force required by synthetic stone molding. The present disclosure may not only omit the pressure system as well as solve the virtual pressure problem, but also shorten a molding time of the synthetic stone. The heavy hammer beating unit formed by the hammer plate 2 and the loading plate 3 and being without pressure system is different from the molding machine for synthesizing a stone with pressure system generally used in the prior art.

The hammer plate 2 and the loading plate 3 in the present disclosure may be separated from each other or an integral structure. The hammer plate 2 is mainly configured to press the synthetic stone mixture, and the loading plate 3 is configured to provide a weight so as to increase a beating force. A structure of the loading plate 3 is much greater than that of the hammer plate 2, thus satisfying the beating force required by pressing.

With reference to FIGS. 1-4, in the above embodiments of the present disclosure, a plurality of supports 21 are provided on the hammer plate 2, and the hammer plate 2 is connected with the loading plate 3 via the supports 21. Each of the supports 21 is formed by an upper transverse plate, a lower transverse plate and a plurality of vertical plates for connecting the upper transverse plate and the lower transverse plate. In this embodiment, the number of the supports 21 is 4, and the four supports 21 are located at four corners of the hammer plate 2 respectively, thus supporting the loading plate 3 to form a cavity structure. The supports 21 in the present disclosure have a relatively higher supporting force, which may satisfy a support requirement.

With reference to FIGS. 1-4, in the above embodiments of the present disclosure, the loading plate 3 is formed by stacking multilayer loading boards 31. The multilayer loading boards 31 are connected together via a bolt. In the embodiments of the present disclosure, the loading board may use a solid steel sheet or a board made of other heavy material. In the embodiments of the present disclosure, the pressures are all provided by the loading plate 3, and thus the loading plate 3 has a large weight. The materials and structures mentioned above can provide enough beating force. By adjusting the number of the loading board 31, a weight of the heavy hammer is adjusted. Certainly, the loading board 31 in the present disclosure may also be a monolayer structure.

With reference to FIGS. 1-4, in the above embodiments of the present disclosure, a frame 22 is further provided on the hammer plate 2, a suspension member 23 is mounted on an edge of the frame 22 and hooked on the hammer plate 2. The frame 22 is configured to define a shape of the synthetic stone mixture. The hammer plate 2 presses the synthetic stone mixture within the frame 22, and the suspension member 23 is configured to connect the frame 22 and the hammer plate 2. When the hammer plate 2 is lifted, the frame 22 is driven to be lifted.

With reference to FIGS. 1-4, in the above embodiments of the present disclosure, the base 1 is provided with a lifting device 11, and the lifting device 11 is connected with the heavy hammer 10. In this embodiment, the lifting device 11 is connected with the loading plate 3, the lifting device 11 is a hydraulic cylinder, a portion of the loading plate 3 is extended outwardly to form a support ear, and the lifting device 11 is connected with the support ear. In this way, it is convenient for the lifting device 11 to lift the loading plate 3 and the hammer plate 2.

With reference to FIGS. 1-4, in the above embodiments of the present disclosure, the driving device 4 is provided on the heavy hammer 10, and the driving device 4 comprises a plurality of drivers synchronously connected together. The plurality of drivers are synchronously connected together to form a synchronous drive group, and the heavy hammer 10 is provided with at least one synchronous drive group. The driving device 4 can generate a force greater than a gravity of the heavy hammer, and thus the driving device 4 may lift the heavy hammer and drive the heavy hammer 10 in a certain speed to beat the synthetic stone mixture. The driving device 4 in the present disclosure may also be other structure form, for example, a driving device disposed out of the heavy hammer, which may drive the heavy hammer performing an up-down reciprocating motion to form beating. In the embodiment of the present disclosure, the driving device 4 is synchronized to be a plurality of groups, which may provide sufficient lifting force for driving the heavy hammer.

With reference to FIGS. 1-4, in the above embodiments of the present disclosure, there is a cavity formed between the hammer plate 2 and the loading plate 3, so that the driving device 4 is mounted in the cavity. The cavity provides a mounting space for the driving device 4. Certainly, the cavity may also be formed by the multilayer loading boards.

Figure 4:
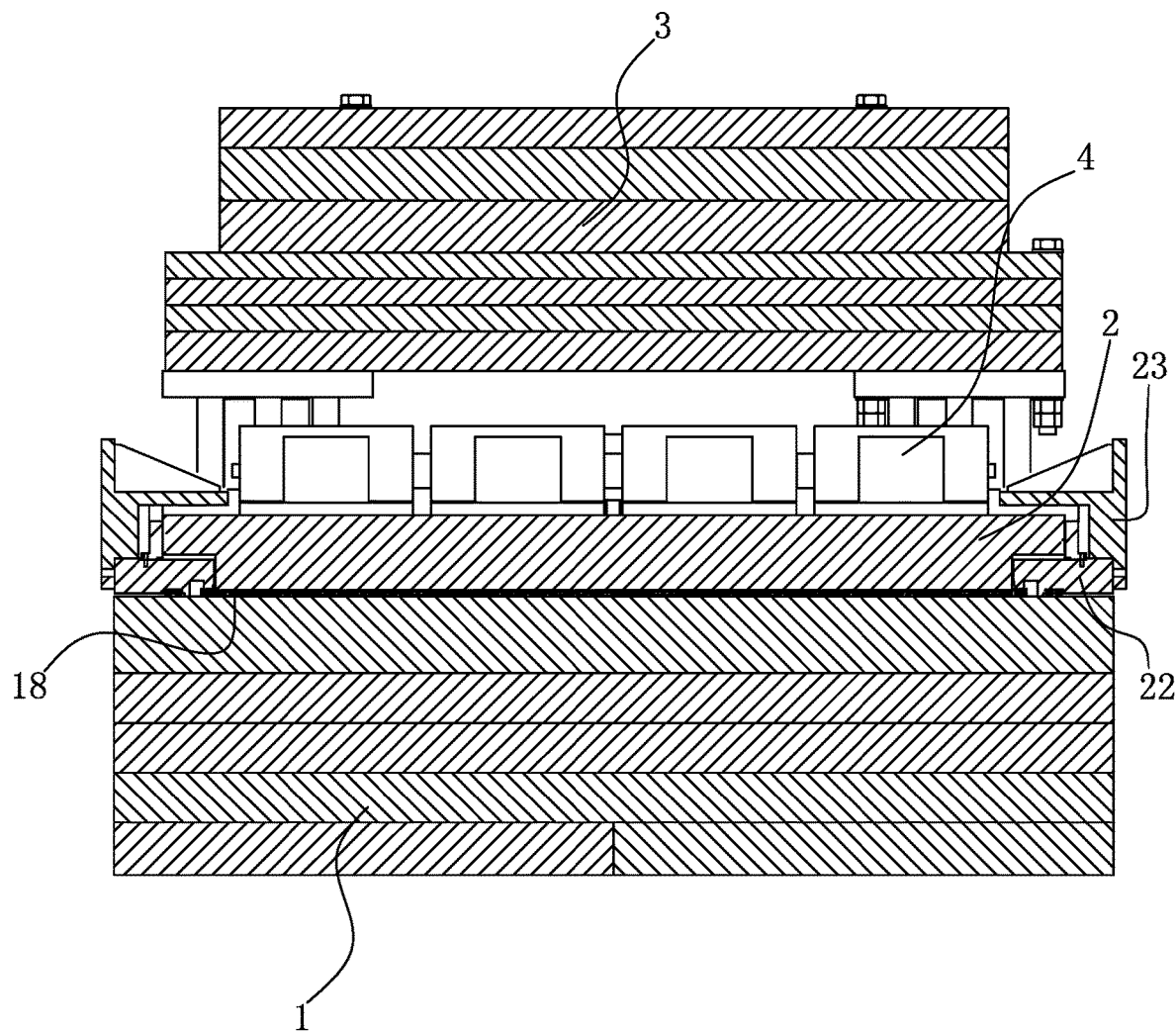
FIG. 4 is a cross sectional view of a first embodiment of the present disclosure.
Figure 5:
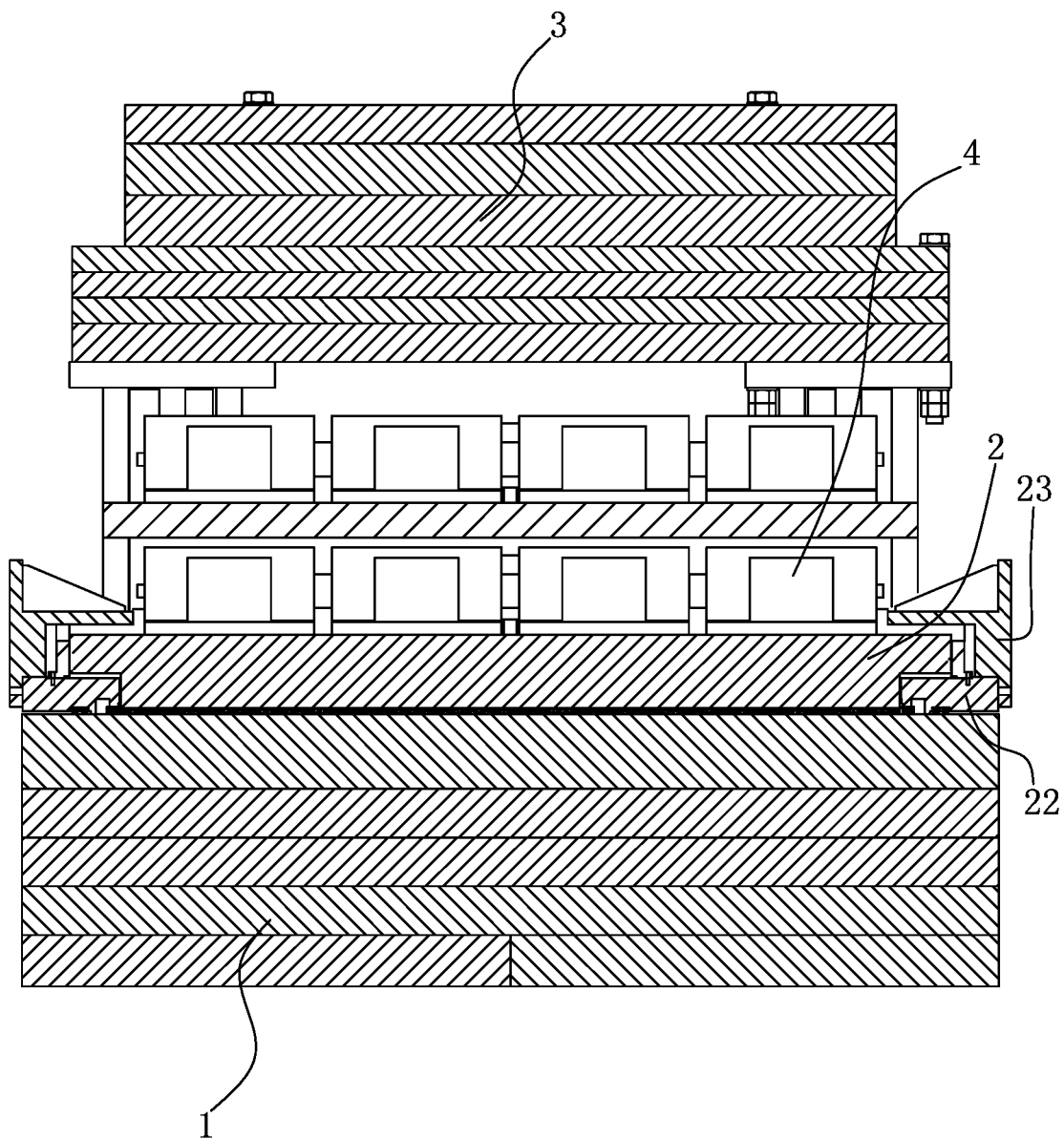
FIG. 5 is a cross sectional view of a second embodiment of the present disclosure.
Figure 6:
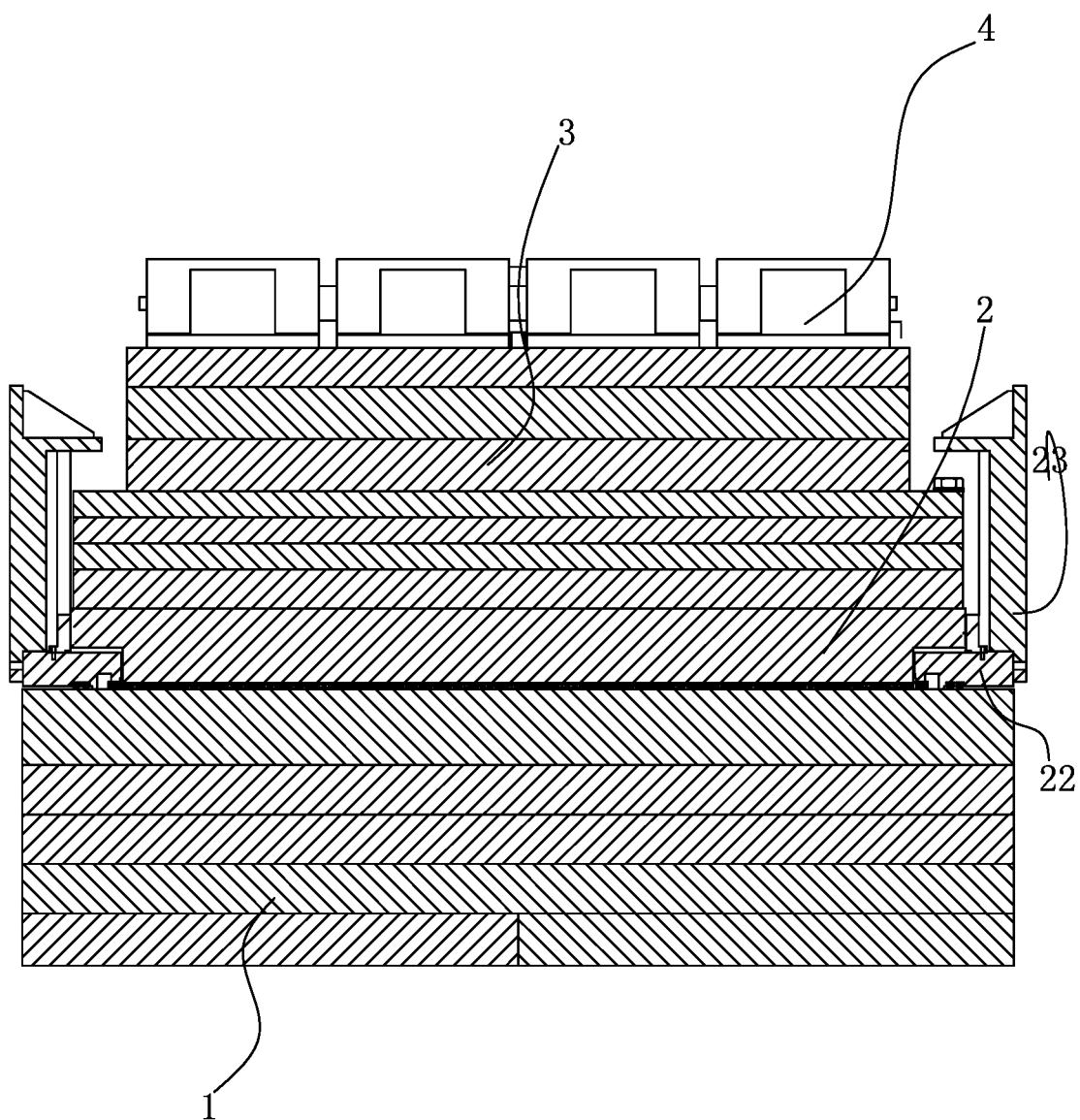
FIG. 6 is a cross sectional view of a third embodiment of the present disclosure.

With reference to FIGS. 1-4, in the above embodiments of the present disclosure, the synchronous drive group is distributed at same or different layers. The synchronous drive group is mounted on the hammer plate and/or on the loading plate. FIG. 4 shows a same layer arrangement of the first embodiment. There are four groups, in which each one of the two middle groups comprises four drivers connected in series respectively, while each one of the two side groups comprises two drivers connected in series respectively. Certainly, in the embodiments of the present disclosure, the driving device may also be hierarchically arranged. For example, FIG. 5 shows a second embodiment, in which two groups of driving device 4 are disposed in a direction of up and down in the cavity. FIG. 6 shows a third embodiment, in which a driving device 4 is disposed on a top of the loading plate 3. Certainly, the driving device 4 may also be disposed on the hammer plate 2 and the loading plate 3 simultaneously. In the embodiments of the present disclosure, the driving device may be one or more of a vibration motor, a hydraulic driver, an air driver and an electromagnetic driver.

Figure 7:
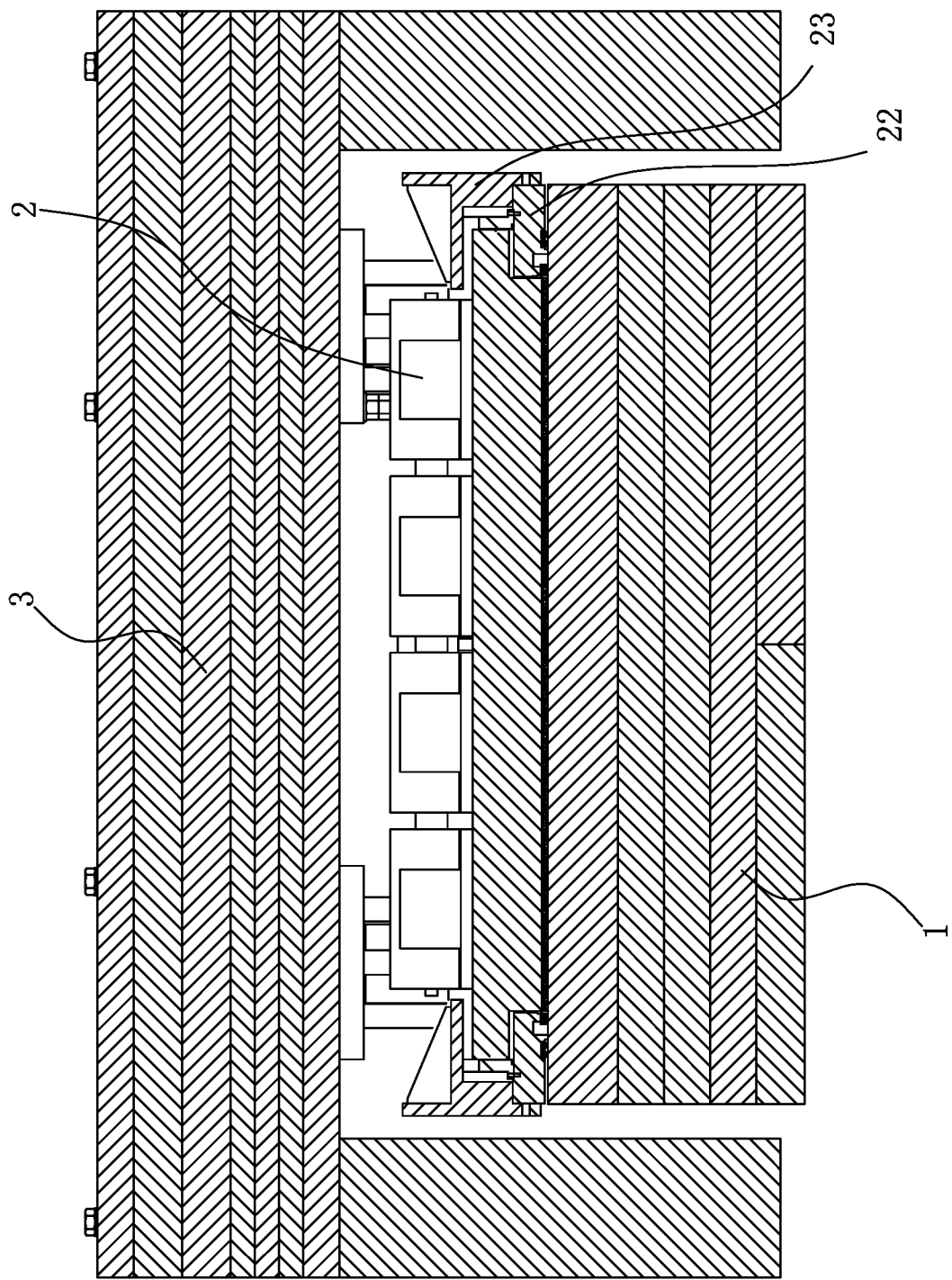
FIG. 7 is a cross sectional view of a fourth embodiment of the present disclosure.

FIG. 7 shows a fourth embodiment of the present disclosure. A primary difference between the fourth embodiment and other embodiments described above is that, a width or a length of the loading plate 3 is greater than that of the hammer plate, and a portion of the loading plate 3 extends out of the hammer plate 2 to form an additional weight. Such structure may reduce a height of the loading plate 3 with remaining sufficient weight of the loading plate 3 and facilitate an arrangement of the apparatus.

With reference to FIGS. 1-4, in the above embodiments of the present disclosure, the base 1 is a monolayer loading board 15 or stacked multilayer loading boards 15, and a gravity of the base 1 is greater than a pulling force instantly generated by the driving device 4. In the embodiments of the present disclosure, the base is a plate structure, which has a more stable contact with the ground base and thus it is not easy to displace. Since a volume and a weight of the base 1 are relatively greater, a relatively greater gravity can be generated. This gravity is greater than the pulling force instantly generated by the driving device 4, such that the base 1 cannot be pulled by the driving device 4, and thus the base 1 may not vibrate. In this way, a problem that a vibration of the base weakens a beating force of the synthetic stone mixture is solved. Meanwhile, the majority of the beating force generated by the driving device 4 acts on the synthetic stone mixture, thus enhancing the molding effect and saving energy. For example, in this embodiment, there are 12 drivers, which may generate a pulling force of 100 tons, while the base 1 is 110 tons in weight, such that the driving device 4 cannot drive the base 1 to vibrate.

With reference to FIGS. 1-4, in the above embodiments of the present disclosure, the multilayer loading boards 15 are connected via bolts 16 to form an integral structure. In the embodiments of the present disclosure, the base 1 is an integral structure, and thus the driving device 4 cannot drive a portion of the base 1 to vibrate. A bottom of a lowermost layer of the loading boards is in contact with the ground base wholly or largely. A bottom of the base 1 is in contact with the ground base as much as possible, such that the base 1 is more stable and it is not easy to displace. The base 1 is stable, such that the beating force of the heavy hammer 10 may act on the synthetic tone mixture as much as possible. The lowermost layer of the loading boards 15 is extended outwardly to form a connection portion 151, the connection portion 151 is provided with a plurality of through holes 17 suitable for connection with the ground base. In the embodiments of the present disclosure, the ground base uses a concrete placement structure, a vibration isolating zone is disposed on an edge of the ground base, a connection member is disposed on the ground base, and the base 1 and the ground base are connected together via bolts. In this way, further the base is not easy to displace. An uppermost layer of the loading board 15 is provided with the material-load zone, and the material-load zone is provided with a protection layer 18. The protection layer 18 provides protective action to a material-load belt that passes through the material-load zone.

According to embodiments of the present disclosure, a processing method for synthesizing a stone by means of beating of a heavy hammer is provided, comprising steps of:
A. burdening, including mixing a mixed aggregate of the synthetic stone, a filler and an adhesive in a ratio to form a synthetic stone mixture;
B. material distributing, including distributing the synthetic stone mixture evenly onto a conveying belt or into a frame according to a desired thickness;
C. shaping, including vacuumizing the synthetic stone mixture, then beating the synthetic stone mixture continuously by the heavy hammer, wherein the adhesive in the synthetic stone mixture flows during beating, thus being distributed uniformly in the synthetic stone mixture and fully filling gaps among particles of the aggregates, and a redundant adhesive is squeezed out of the synthetic stone mixture to form a dense synthetic stone board;
D. solidifying, including solidifying the molded synthetic stone board to form a finished product.

In the above embodiments of the present disclosure, a mass m of the heavy hammer is determined by a formula, $$m = A \times (\rho_{aggregate} \times a\% + \rho_{adhesive} \times b\%) \times V \times K$$

where A is a particle amount coefficient of the mixed aggregate of the synthetic stone, A is a constant, and $A \leq 1$;
$\rho_{aggregate}$ is a particle density of the mixed aggregate of the synthetic stone, a unit of $\rho_{aggregate}$ is kg/m³, and a % is a ratio of the mixed aggregate of the synthetic stone;
$\rho_{adhesive}$ is an adhesive density, a unit of $\rho_{adhesive}$ is kg/m³, and b % is a ratio of the adhesive;
V is a volume of the synthetic stone mixture, and a unit of V is m³;
K is a mass coefficient of the heavy hammer, K is a constant and ranges from 100 to 3000. Preferably, K ranges from 800 to 3000, and may take a value of 1500 or 2000. K is determined by a variety of the matter according to experience, and it usually takes a value of 1500.

The particle amount coefficient of the mixed aggregate of the synthetic stone is determined by a particle size of the aggregate, and is increased as the particle size of the aggregate is reduced. The particle amount coefficient A of the mixed aggregate of the synthetic stone is determined by a particle size of the aggregate, and is increased as the particle size of the aggregate is reduced. The particle amount coefficient A of the mixed aggregate of the synthetic stone is 0.8 to 1 if the particle size is less than 100 micrometers; the particle amount coefficient A of the mixed aggregate of the synthetic stone is 0.2 to 0.8 if the particle size ranges from 100 micrometers to 1000 micrometers; and the particle amount coefficient A of the mixed aggregate of the synthetic stone is 0.04 to 0.2 if the particle size is greater than 1000 micrometers.

In the embodiments of the present disclosure, the particle amount coefficient of the mixed aggregate of the synthetic stone is used for reflecting an aggregate amount per unit volume. If the amount is large, it means that a displacement force required by the aggregate is great, and the heavy hammer beating force is required to be great. The particle amount coefficient of the mixed aggregate of the synthetic stone is determined by an overall particle size according to experience.

The particle amount coefficient A of the mixed aggregate of the synthetic stone is calculated by $$A = A_1 \times R_1\% + A_2 \times R_2\% + A_3 \times R_3\% \ldots + A_n \times R_n\%$$

where $A_1, A_2, A_3 \ldots A_n$ are coefficients of aggregates with different particle sizes, and $R_1, R_2, R_3, \ldots R_n$ are ratios of aggregates with different particle sizes.

In this embodiment, quartz is taken for example. A density of quartz is $\rho_{aggregate} = 2600$ kg/cm³. A generally used particle size of the matter comprises: 13 μm, 18 μm, 23 μm, 38 μm, 45 μm, 58 μm, 109 μm, 212 μm, 380 μm, 830 μm, 1700 μm, 3350 μm, 4750 μm and 8000 μm. According to experience, it is firstly determined that the coefficient of aggregate with minimum particle size of 13 μm is 1, and the coefficients of aggregate with other particle sizes are 0.99, 0.98, 0.95, 0.91, 0.89, 0.79, 0.68, 0.58, 0.30, 0.15, 0.12, 0.08, 0.05, respectively.

A synthetic stone quartz board with a length of 1 m, a width of 1 m and a height of 0.01 m is pressed, in which the amount of aggregate is a %=90%, quartz with particle size of 38 μm is 30%, quartz with particle size of 109 μm is 20%, quartz with particle size of 212 μm is 20%, quartz with particle size of 380 μm is 21%, the density of the adhesive is $\rho_{adhesive} = 1130$ kg/m³, and the ratio of the adhesive is b %=9%.

Then, $A = 0.95 \times 30\% + 0.79 \times 20\% + 0.68 \times 20\% + 0.58 \times 21\% = 0.285 + 0.158 + 0.136 + 0.1218 = 0.7008$, and the mass of the heavy hammer is $m = 0.7008 \times (2600 \times 91\% + 1130 \times 9\%) \times 0.01 \times 1500 = 25940.46$ kg.

If the heavy hammer is configured according to the weight above, it may satisfy a board molding requirement for manufacturing a board. According to embodiments of the present disclosure, when selecting an experience value, in principle the mass of the heavy hammer for pressing a synthetic stone with a thickness of 1 cm, a width of 1 m and a length of 1 m is 1 ton to 35 tons. A particular value is determined by elements including a shape of the board, a thickness of the board, a variety of the matter, a particle size of the matter, etc. Technical features of the heavy hammer determined in the processing method embodiments of the present disclosure are also suitable for the molding machine embodiments.

What is claimed is:

1. A processing method for synthesizing a stone by beating of a heavy hammer, comprising:
mixing a mixed aggregate of a synthetic stone, a filler, and an adhesive in a ratio to form a synthetic stone mixture;
distributing the synthetic stone mixture evenly onto a conveying belt or into a frame according to a desired thickness;
vacuumizing the synthetic stone mixture, and beating the synthetic stone mixture continuously by the heavy hammer, wherein the adhesive in the synthetic stone mixture flows during beating to be distributed uniformly in the synthetic stone mixture and fully filling gaps among particles of aggregates, and squeezing a redundant adhesive out of the synthetic stone mixture to form a dense synthetic stone board; and
solidifying the dense synthetic stone board to form a finished product.

2. The method of claim 1, wherein a mass m of the heavy hammer is determined by $$m = A \times (\rho_{aggregate} \times a\% + \rho_{adhesive} \times b\%) \times V \times K$$

where A is a particle amount coefficient of the mixed aggregate of the synthetic stone and is a constant, and A≤1;

$\rho_{aggregate}$ is a particle density of the mixed aggregate of the synthetic stone, a unit of $\rho_{aggregate}$ is $kg/m^3$, and a % is a ratio of the mixed aggregate of the synthetic stone;

$\rho_{adhesive}$ is an adhesive density, a unit of $\rho_{adhesive}$ is $kg/m^3$, and b % is a ratio of the adhesive;

V is a volume of the synthetic stone mixture, and a unit of V is $m^3$; and

K is a mass coefficient of the heavy hammer, K is a constant and ranges from 100 to 30.

3. The method of claim 2, wherein the particle amount coefficient A of the mixed aggregate of the synthetic stone is determined by a particle size of the aggregate, and is increased as the particle size of the aggregate is reduced,
the particle amount coefficient A of the mixed aggregate of the synthetic stone is 0.8 to 1 when the particle size is less than 100 micrometers;
the particle amount coefficient A of the mixed aggregate of the synthetic stone is 0.2 to 0.8 when the particle size ranges from 100 micrometers to 1000 micrometers; and
the particle amount coefficient A of the mixed aggregate of the synthetic stone is 0.04 to 0.2 when the particle size is greater than 1000 micrometers.

4. The method of claim 2, wherein the particle amount coefficient A of the mixed aggregate of the synthetic stone is calculated by $$A = A_1 \times R_1\% + A_2 \times R_2\% + A_3 \times R_3\% \ldots + A_n \times R_n\%$$

where $A_1, A_2, A_3 \ldots A_n$ are coefficients of aggregates with different particle sizes, and $R_1, R_2, R_3, \ldots R_n$ are ratios of aggregates with different particle sizes.

5. A molding machine for synthesizing a stone by beating of a heavy hammer, comprising:
a base;
a heavy hammer mounted on the base; and
a driving device for driving the heavy hammer, wherein the base is provided with a material-load zone, and the heavy hammer is configured to beat the material-load zone,
wherein the heavy hammer comprises:
a hammer plate in contact with a synthetic stone mixture in the material-load zone; and
a loading plate located on the hammer plate for increasing a weight of the heavy hammer, wherein the loading plate and the hammer plate are connected together.

6. The molding machine of claim 5, wherein a plurality of supports are provided on the hammer plate, and the hammer plate is connected with the loading plate via the supports.

7. The molding machine of claim 5, wherein the loading plate is formed by stacking multilayer loading boards.

8. The molding machine of claim 5, wherein a frame is further provided on the hammer plate, a suspension member is mounted on an edge of the frame, and the suspension member is hooked on the hammer plate.

9. The molding machine of claim 5, wherein the base is provided with a lifting device, and the lifting device is connected with the heavy hammer.

10. The molding machine of claim 5, wherein the driving device is provided on the heavy hammer, and the driving device is composed by a plurality of drivers synchronously connected together.

11. The molding machine of claim 10, wherein the plurality of drivers are synchronously connected together to form a synchronous drive group, and the heavy hammer is provided with at least one synchronous drive group.

12. The molding machine of claim 11, wherein the synchronous drive group is distributed at the same or different layers.

13. The molding machine of claim 5, wherein the driving device is mounted on at least one of the hammer plate and the loading plate.

14. The molding machine of claim 5, wherein the base comprises a monolayer loading board or stacked multilayer loading boards, and gravity of the base is greater than a pulling force instantly generated by the driving device.

15. The molding machine of claim 14, wherein
the stacked multilayer loading boards are connected via bolts to form an integral structure,
a bottom of a lowermost layer of the stacked multilayer loading boards is in contact with a ground base wholly or largely,
the lowermost layer of the stacked multilayer loading boards is extended outwardly to form a connection portion,
the connection portion is provided with a plurality of through holes suitable for connection with the ground base,
an uppermost layer of the stacked multilayer loading boards is provided with the material-load zone, and
the material-load zone is provided with a protection layer.

* * * * *